Figure 1:
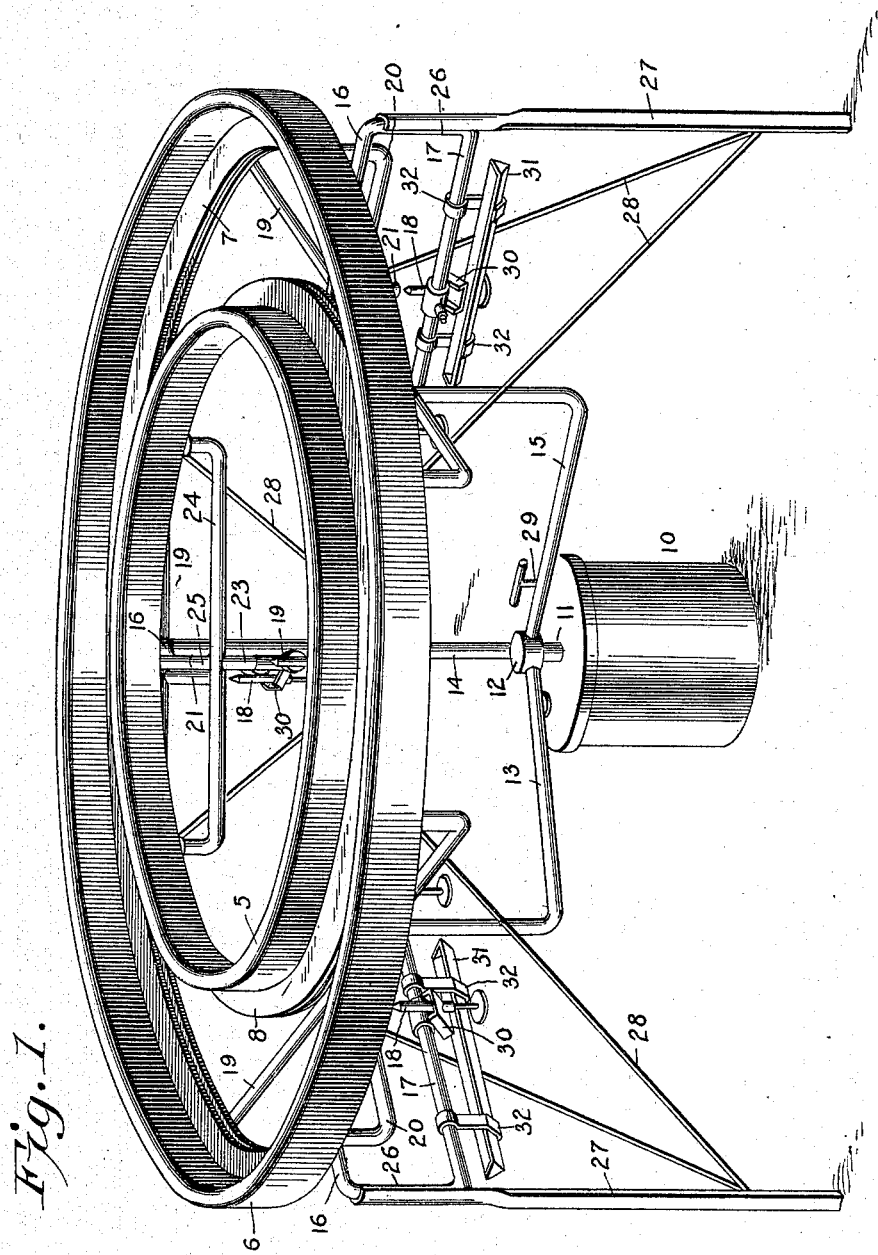

No. 681,213. Patented Aug. 27, 1901.
S. GLEAZEN.
TIRE HEATER.
(Application filed Nov. 6, 1900.)
(No Model.) 2 Sheets—Sheet 1.

Witnesses
Howard D. Orr.
Geo. H. Chandler.

S. Gleazen, Inventor
by C. A. Snow & Co.
Attorneys

No. 681,213. Patented Aug. 27, 1901.
S. GLEAZEN.
TIRE HEATER.
(Application filed Nov. 6, 1900.)
(No Model.) 2 Sheets—Sheet 2.
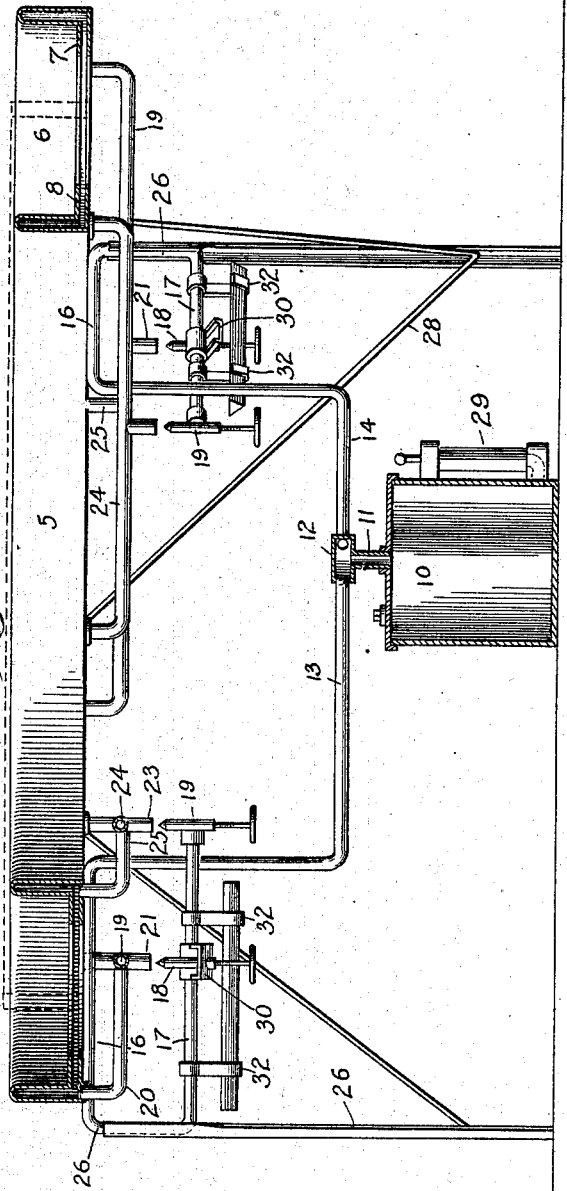
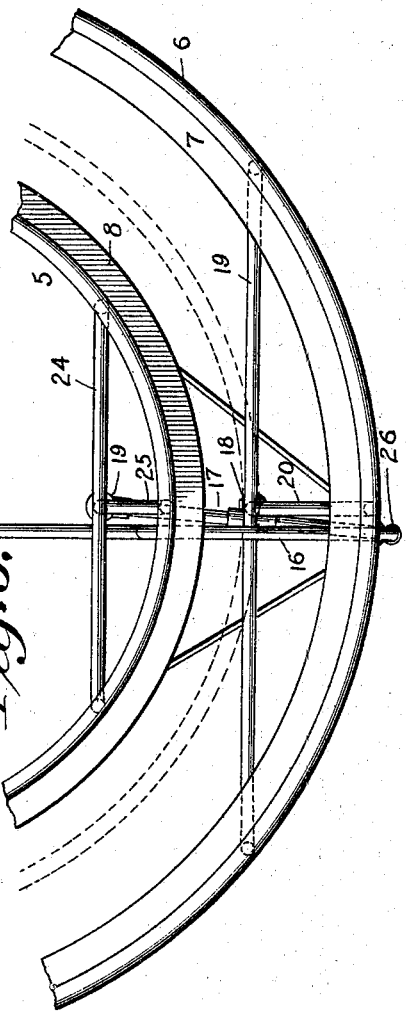
Witnesses
Howard D. Orr,
Geo. T. Chandlee.
S. Gleazen, Inventor
by C. A. Snow & Co.
Attorneys

UNITED STATES PATENT OFFICE.

SILAS GLEAZEN, OF FORT COLLINS, COLORADO.

TIRE-HEATER.

SPECIFICATION forming part of Letters Patent No. 681,213, dated August 27, 1901.

Application filed November 6, 1900. Serial No. 35,656. (No model.)

*To all whom it may concern:*

Be it known that I, SILAS GLEAZEN, a citizen of the United States, residing at Fort Collins, in the county of Larimer and State of Colorado, have invented a new and useful Tire-Heater, of which the following is a specification.

This invention relates to a device for heating tires prior to their application to wheels, the object of the invention being to provide a simple and efficient construction wherein the tire to be heated may be placed directly in the flames of the burner and in position to receive the flames at both sides thereof, so that the tire will be heated to the proper degree in the shortest possible time, a further object of the invention being to provide a structure wherein the flame from the burner will be continuous throughout the inner and the outer peripheries of the tire, so that the tire will expand in the same degree throughout.

Additional objects of the invention relate to the efficient arrangement of the fuel-tank, the mixers, and the vaporizers and will be readily understood by reference to the following specification.

In the drawings forming a portion of this specification, and in which like numerals of reference indicate similar parts in the several views, Figure 1 is a perspective view showing the complete heater. Fig. 2 is a diametrical section of the apparatus, taken in a vertical plane and showing the position of the tire during the heating operation. Fig. 3 is a top plan view of a portion of the apparatus.

Referring now to the drawings, the present apparatus includes a burner comprising two concentric rings 5 and 6, both of which are hollow and are closed at their upper edges, they being disposed to lie in a common horizontal plane. The outer ring has an inwardly-directed flange 7 at its lower edge, while at the lower edge of the inner ring is formed the outwardly-directed flange 8, these flanges 7 and 8 lying in a common horizontal plane.

The rings, as above stated, are hollow and may be formed each from a single sheet of metal by pressing, the interspace of each of the rings extending through the edge of the flange thereof. Thus the outer ring has an opening through the edge of its flange which opens in the direction of the opening in the flange of the ring 5. The two burner-rings are supported upon a framework, as follows:

A fuel tank or reservoir 10 is provided, and leading from the upper end thereof is a pipe 11, terminating in a cylindrical head 12, from which radiate a plurality of pipes 13, 14, and 15, in the present instance three in number. Each of these pipes is taken outwardly and then upwardly in a line passing within the inclosure of the ring 5 and then outwardly, as shown at 16, to form supports for the rings 5 and 6, which are disposed and secured thereon. After passing beyond the ring 6 the pipes are each taken downwardly and inwardly and terminate beyond the upwardly-projecting portions referred to, these inwardly-disposed portions being shown at 17 and having needle-valves 18 and 19, which are disposed to discharge upwardly.

At right angles to the portions 16 of the pipes 13, 14, and 15 and directly therebelow are disposed pipes 19', the ends of which are turned upwardly and connected with the ring 6 in the plane of the vertical or body portion thereof, and midway of the ends of each of these pipes 19' is connected a branch pipe 20, the outer end of which is bent upwardly and is also connected with the ring 6 midway of the points of connection of the ends of the pipe 19'. At the point of connection of the pipe 20 with the pipe 19' is a depending pipe-section 21, which communicates at its upper end with said pipes 19' and 20, its lower end being open and disposed directly over the needle-valve 18 and spaced slightly therefrom, this depending pipe-section forming the mixer for the apparatus at this point. A second mixer in the form of a pipe-section 23 is disposed above and spaced slightly from the needle-valve 19. This pipe 23 is connected at the point of jointure of two pipes 24 and 25, of which the pipe 24 lies at right angles to the portion 16 and has its ends upturned and connected with the ring 5, the pipe 25 forming a branch of the pipe 24 midway of the ends of the latter and having its extremity upturned and connected also with the ring 5.

Between the portions 16 and 17 of the pipes 13, 14, and 15 are the vertical portions 26, above referred to, and these vertical portions are engaged with sheet-metal supporting-legs 27, the upper portions of which are bent around the portions 26 of the pipes and secured in place in any suitable manner. Brace-rods 28 connect the lower portions of the legs with the ring 5.

Pressure is supplied to the tank 10 by means of an air-pump 29, it being understood that the fuel used is gasolene or other similar volatile and combustible fluid.

The operation of the apparatus is as follows: The tire to be heated is disposed with its lower edge between the flanges of the rings 5 and 6 and resting upon the portions 16 of the fuel-supply pipes 13, 14, and 15. The pump is then operated to force a quantity of fuel upwardly through the pipes, and the needle-valves 18 are opened to permit fuel to run therefrom and down the valve to the chute 30, carried by the valve, the fuel then dripping from the chute to the trough 31, which is disposed beneath and suspended from each of the portions 17 of the fuel-pipes by means of hangers 32. The fuel in each of the troughs 31 is then ignited, and the heat therefrom gasifies the fluid in the portions 16 and 17 of the pipes. The needle-valve 18 may be turned off during the burning of the fuel in the trough, and when this fuel has burned out both valves are opened, when the gas generated passes therefrom and up through the mixers and thence to the gas-delivering pipes and through them to equidistant points of the burner-rings, finally passing through the openings at the free edges of the flanges of the rings. This gas may be ignited as it comes from the flanges of the rings, and the resultant flame is of course directed directly against both the inner and outer face of the tire. The flames are furthermore deflected downwardly and upwardly, passing both under and over the tire, and thus is a uniform heat administered, with the result that the tire is expanded with practical uniformity and when removed and placed upon a wheel will contract with equal uniformity, so that the completed wheel will have the proper shape. The flames which are deflected downwardly come in contact with the portions 16 of the fuel-supply or feed pipes, acting to volatilize the fluid therein, and thus to continue the supply of gas from the needle-valves. The gas in passing into the mixing-tubes of course draws air with it, so that the proper supply of gas and air is secured.

It will be understood that in practice various modifications of the specific construction shown may be made and that any suitable materials and proportions may be used for the various parts without departing from the spirit of the invention as claimed.

What is claimed is—

1. A device of the class described comprising concentric annular burners disposed to discharge toward each other, fuel-supply pipes disposed to bridge the interval between the burners to receive a tire, gas-supply pipes connected with the burners, and mixers carried by the gas-supply pipes and disposed to receive from the fuel-pipes, said fuel-pipes being adapted to receive the flames from the burners.

2. A device of the class described comprising concentric annular burners disposed to discharge toward each other and separated by an interspace, mixers connected with the burners, and fuel-supply pipes leading to the mixers, said supply-pipes being disposed to bridge the interspace between the burners to support a tire in position to deflect the flames from the burners to the pipes.

3. A device of the class described comprising concentric annular burners separated by an interspace, a reservoir, fuel-supply pipes leading from the reservoir and disposed against the under sides of the burners and bridging the interspace to form supports for a tire, valves for the pipes, and gas-feed pipes connected with the burners and having depending mixing-pipes disposed to receive gas from the valves.

4. A device of the class described comprising hollow rings disposed concentrically in a common horizontal plane, said rings having flanges at their lower edges through which are formed discharge-openings, a reservoir, pipes leading from the reservoir and arranged to support the rings, said pipes being disposed to bridge the interspace between the rings to form a support to sustain a tire between the rings, supporting-legs connected with said pipes, and gas-supply pipes connected with the rings and having mixing-tubes, the first-named pipes having valves disposed to discharge to the mixing-pipes.

In testimony that I claim the foregoing as my own I have hereto affixed my signature in the presence of two witnesses.

SILAS GLEAZEN.

Witnesses:
S. STOWER,
E. D. AVERY.